(12) United States Patent
Geeves et al.

(10) Patent No.: US 10,983,991 B1
(45) Date of Patent: Apr. 20, 2021

(54) PROJECT MANAGEMENT SYSTEM DATA STORAGE

(71) Applicants: Atlassian Pty Ltd., Sydney (AU); Atlassian Inc., San Francisco, CA (US)

(72) Inventors: Jonathon Patrick Geeves, Sydney (AU); Maria Florencia Bonansea, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/037,559

(22) Filed: Sep. 29, 2020

(51) Int. Cl.
  *G06F 16/23* (2019.01)
  *G06F 16/21* (2019.01)
  *G06Q 10/10* (2012.01)

(52) U.S. Cl.
  CPC ........ *G06F 16/2379* (2019.01); *G06F 16/219* (2019.01); *G06F 16/2365* (2019.01); *G06Q 10/103* (2013.01)

(58) Field of Classification Search
  CPC . G06F 16/2379; G06F 16/219; G06F 16/2365
  USPC .......................................................... 707/756
  See application file for complete search history.

(56) References Cited

U.S. PATENT DOCUMENTS

| | | | |
|---|---|---|---|
| 5,826,252 A * | 10/1998 | Wolters, Jr. ...... | G06Q 10/06313 717/101 |
| 10,706,626 B1 * | 7/2020 | Brent .................. | G06F 3/011 |
| 2004/0068517 A1 * | 4/2004 | Scott .................. | G06Q 10/10 |
| 2016/0364674 A1 * | 12/2016 | Macatangay ........ | G06Q 10/04 |

* cited by examiner

*Primary Examiner* — James Trujillo
*Assistant Examiner* — Fariborz Khoshnoodi
(74) *Attorney, Agent, or Firm* — Brownstein Hyatt Farber Schreck, LLP (57) ABSTRACT

Described herein is a computer implemented method and computational system for a project management service. Issues of a project are defined by data entities stored in a tree structure including a root node. The tree structure may include one or more siblings to the root node, one or more child nodes and one or more siblings to the child node. The root node references each child node and references each of its sibling nodes. Each child node references each of its sibling nodes.

19 Claims, 6 Drawing Sheets

PROJECT MANAGEMENT SYSTEM DATA STORAGE

TECHNICAL FIELD

The present disclosure is directed to systems and methods for storing and updating data for a project management system.

BACKGROUND

Project management systems can substantially assist project managers/supervisors and project team members with work flow management. They can, amongst other things, assist with prioritizing tasks, allocating resources, developing a roadmap and aid in collaboration.

Traditional project management software tools may be configured to track data associated with a project or team and may be implemented on a server or other hardware configuration. Expanding existing systems to scale in size and capacity for a growing organization can be difficult using traditional techniques as it may be difficult to provide reliable access to current or accurate data across a system that is distributed over multiple servers or platform instances. Additionally, current systems may be limited by the size of the data that can be effectively managed and may begin to experience performance issues as the required data is increased to service an expanding platform. The systems and techniques described herein may be used to improve access to accurate project management data as compared to some traditional techniques.

SUMMARY

Embodiments of a method include providing at a server system at least one software service, including maintaining in a database at least one issue for a project management service. The at least one issue includes a plurality of data entities in the database including a first data entity and a second data entity. The first data entity and the second data entity may be subject to at least one size constraint within the database. The method includes receiving at the server system a first request to update the issue and in response reading the first data entity and the second data entity and determining based on the at least one size constraint, that a third data entity is required for the issue in the database. The third data entity is created and the first and/or second data entity is changed by a change process.

The change process may include populating a second field of the first data entity with a reference to the third data entity, wherein the second field is different to the first field and wherein the third data entity has a plurality of common fields with the first data entity. The change process may include populating a first field of the second data entity with a reference to the third data entity, wherein the third data entity has a plurality of common fields with the second data entity.

Embodiments of a processing system include: one or more processing devices; database storage in communication with the one or more processing devices and software executable by the one or more processing devices. The software includes instructions to configure the one or more processing devices to provide a project management service including maintaining in the database storage data entities defining nodes for an issue associated with a project, the data entities including data entity defining a root node for the issue and a data entity defining a child node of the root node. The instructions also, based on at least one size limit in relation to the data entities, create one or more sibling nodes for at least one of the root node and the child node to receive additional information for the issue.

The processing system may be configured to limit the nodes associable with an issue to the root node, one or more sibling nodes to the root node and one or more sibling nodes to the child node, whereby all nodes associable with an issue are readable within three read operations of the database.

Embodiments of non-transient computer readable memory store instructions, which when executed by a processing system cause the processing system to perform a method, including: configuring the processing system to provide a project management service including maintaining in a database storage data entities defining nodes for an issue associated with a project, the data entities comprising a first data entity defining a root node for the issue and a second data entity defining a child node of the root node; and maintaining at least one size limit in relation to the data entities maintained in the database storage. The method may further include, based on the at least one size limit, creating one or more sibling nodes for at least one of the root node and the child node to receive additional information for the issue.

Further embodiments will become apparent from the following description, given by way of example and with reference to the accompanying drawings.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

An example of a project management system for project management teams is the family of products generally called Jira Software™, available from Atlassian, Inc or Atlassian Pty Ltd. Jira Software™ and other project management software implementing a project management system may be provided as an on premises server solution, for example Jira Server™ in which case a user may install the software on a server system controlled by them, or as software as a service ("SaaS") solution, for example Jira Cloud™ in which case a plurality of different users may each access a centralised server system that is "in the cloud" and controlled by another party.

At least in the case of a cloud implementation, in which there may be many tenants each with many issues, the number of issues of the project management system may become large, for example more than a million or more than several million. A user, for example a large organisation, of a server system implementation may also manage a large number of issues with its project management system.

For the purposes of illustration and explanation, the following structure and terminology for a project management system is adopted:

A "project" is a collection of one or more tasks that need to be addressed by users of a project management system. An example task is to address an identified bug within software. Another example task is to add an identified feature to software, for example by developing and testing code implementing the feature. Each task of a project is associated with the project in the project management software and a project is defined at least in part by its tasks.

An "issue" is a definition of a task or part of a task for a project. An example of an issue is an identified bug, which directly or indirectly defines a task of addressing the bug. An issue is stored associated with a project to identify that it is an issue of the project.

An "issue type" is a categorisation of an issue. For example, issues relating to addressing an identified bug within software may have a type called a "bug issue type", whereas issues relating to adding a feature to software may have a different issue type, for example called a "feature issue type". An issue type is stored associated with an issue to identify the categorisation of the issue.

A "workflow" is a set of statuses and transitions between statuses that an issue moves through during its lifecycle. For example, a workflow may represent an organisational process. A "status" represents the state of an issue at a specific point in the workflow. A transition is a link between two statutes that enables an issue to move from one status to another.

A "comment" is for holding information, typically information received by the project management system from a user of the project management system, in relation to an issue. The comment is stored in the project management system associated with one or more issues.

Each of the items highlighted in bold underline in the preceding paragraphs may be data entities within a storage and retrieval system of the project management system. For example a particular workflow is a first data entity in the system, another workflow is a second (i.e. different to the first) data entity in the system and an issue is a third (i.e. different to the first and different to the second) data entity. The project management system may include other data entities.

With the prospect of a large number of data entities, including for example a large number of issues and potentially a large number of comments, the scalability and efficiency of the data storage and retrieval methodology becomes increasingly relevant to the performance of the project management system. One database structure for holding data entities of a project management system is a database with a tree structure. For example, the database may include one or more tables for storing respective collections of data, each table including zero or more items and each item associated with one or more attributes. One or more attributes may be nested, so that an attribute is associated with one or more other attributes, one or more of which may be associated with one or more further attributes and so forth.

In an implementation of a project management system, an issue may be stored as a data entity, for example a table. This is called herein an issue node. An issue node includes a number of items or fields. Example items or fields include an identifier field for an identifier of the issue or issue node (the identifier may be a GUID), a field for identifying that the node type is an issue node, a field for identifying the issue type, a version field which may be updated with changes within the issue node, and data or in other words a payload for the issue. The payload for the issue may include one or more fields.

An example payload field is a status field. A populated status field contains an identifier of a status for the issue. As described above, an issue and its available statuses may be related by a workflow.

Another example payload field is a field reference. A populated field reference field contains an identifier of at least one "child" node that stores other issue field values. A field reference may take the form of a Map<Set<FieldId>, NodeId>. The NodeID is an identifier of the child node and will be a GUID of the project management system. The child node storing field values (i.e. the node identified by NodeID) for a FieldId may itself be a table in the database. The Set<FieldId> is the set of fields that has field values stored in the node identified by the NodeId. The number of fields referenced by Set<FieldId> is dependent on the maximum size of a field. Large amounts of data may be stored in a separate field content service with the payload of a node storing field values including a field content service identifier, usable by the project management service to extract content from the field content service as required. An example of a field reference is a reference to a node that in turn references comments. In particular, the list of comments stored in relation to an issue may be stored in a child node, where the FieldId is a Comment Field identifier, and the NodeId is the child node identifier of the node storing all the comment values. An example of a field with a large amount of data is the description field of an issue. The content of the description may be stored in a content service, and the populated field value payload is the content service identifier.

Another example payload field is a sibling node reference field. A populated sibling node reference field contains an identifier of at least one sibling node to the issue node. Sibling nodes have the same structure as the issue node. A sibling node reference field may take the form List<NodeId>. The NodeID will be a GUID of the project management system and refer to a node (e.g. table) storing the identifiers of zero or more sibling nodes. The use of sibling nodes is described herein below.

The issue data has a set of fields, which each may be viewed as an inline field or a list field. In some embodiments some or all inline fields have a 1 to 1 relationship with an issue, or a relatively small number of values in the relationship between the issue and the field—these are considered inline fields. The inline fields may be stored in the relevant fields attribute in a form FieldId/FieldType/FieldValue, in which: the FieldId is a system reference for the system field (which may be a GUID), usable for example in read and editing operations; the FieldType indicates the nature of the field (e.g. a single FieldId, a set or a list); and the FieldValue is the data populated in the field, for example a status identifier for the relevant status data entity. Fields in a list of fields are attributed in the form FieldId/FieldType/ListFieldItem, where each ListFieldItem is a data entity from a list of fields, (e.g. a single comment from a list of comments). These fields might be stored as inline list fields or in its own node when the number of items exceeds the limit allowed. The list field node is a child node, and it is stored with a child node reference field in the Issue Node. More details are described herein below.

In some embodiments each inline field is characterised by having a FieldValue that is an identifier of another entity in the project management system. As these identifiers may have a relatively small and consistent size, the system fields/inline fields may be set with a maximum size selected to accommodate the identifier size or expected identifier size, to improve density.

More generally, an example payload field is a child node reference field. A populated child node reference field contains a reference to a node that stores child field values. As mentioned above, an example of a type of child field value is a reference to a comment on an issue. Other examples may include references to a worklog or change history on an issue. The comments, worklogs, change histories themselves may be stored in a field content service, with the child field values referencing the field content service. In contrast to inline fields, the child field values may have a 1:n relationship with an issue. For example a single issue may have zero, one or more than one, potentially many, associated comments. In some embodiments the child field values of a single node all reference items of the same type e.g. they all reference comments, so that the node does not include references to a mixture of types, e.g. some comments and some worklogs. In these embodiments, each node may be saved by type. A child node reference field may take the for Map<FieldId, NodeId>, in which the FieldId is a system reference for the child node (e.g. one that the system associates with the issue and the type of child field values that the node contains) and the NodeId is a GUID within the system.

List Fields, which are fields with a 1:n relationship with an issue, are stored based on one order criteria. The order is determined by an order_key. When the list field is requested, the list field items are provided in the order, based on the order_key.

One or more, preferably all, the identifiers mentioned above may be a globally unique identifier (GUID) of the project management service. The GUID is generated by the project management service, for example on creation of the node. In some embodiments unique identifiers are used to represent each customer of a project management system. This customer identifier is used in the project management system to identify the active data of the customer in the project management system. The GUID may then be a suffix to the customer identifier. The customer identifier allows the system to operate over all the data for customer's project management system. These operations include, for example, the migration of the data from one region to another, and the deletion all the data when required.

There may be one or more than one of each type of payload field in an issue node, including one or more than one of each type of payload field described above. For example, in some embodiments there may be a single status field in an issue node. In other embodiments there may be two status fields, e.g. one representing a current status and the other representing a preceding status.

An example database system that incorporates a table structure suitable to implement a structure as described above is DynamoDB™ of Amazon Technologies, Inc. Other nonrelational databases may also be used.

DynamoDB™ and other databases may have a size limit for nodes. The size limit may for example be 400 KB. This may be insufficient to hold all information required of the node. For example, for particular issue defined by an issue node, the number of populated field reference fields may be on creation or may grow over time through use of the project management system such as to result in an issue node exceeding the maximum size if all field reference fields were stored in the issue node. In another example, one or more child nodes referenced by the field reference fields by may be required to store field values that result in the maximum size being exceeded. In a further example one or more of the nodes that store child field values may exceed the maximum size. The size limit may be the same across all nodes or could be set to different levels for different nodes, for example a node of one type may have one size constraint and a node of another type may have a different size constraint.

The sibling node reference field is used to accommodate data across two or more nodes. For example, one issue node (a "root issue node") may be created by a project management system during its operation. At the time of creation of the root issue node or at a later time, the sibling node reference field is populated with an identifier of another node (a "sibling issue node"). In some embodiments the sibling issue node has the same structure as the root issue node, including like system fields/inline fields populated with the same values in the sibling issue node as the root node. Notable exceptions include the identifier field and the sibling node reference field. The sibling issue node has its own identifier in the identifier field, which is the identifier referenced in the sibling node reference field of the root issue node and which may be a GUID.

In another example, a child node (a "root child node") of an issue node, includes a sibling node reference field. When populated, this refers to another child node (a "sibling child node"). In a similar way as the sibling issue node shares the structure of the root issue node as described above, the sibling child node may have the same structure as the root child node, except with a different identifier or GUID populated in its identifier field and at least the option to include a null or differently populated sibling node reference field.

Figure 1:
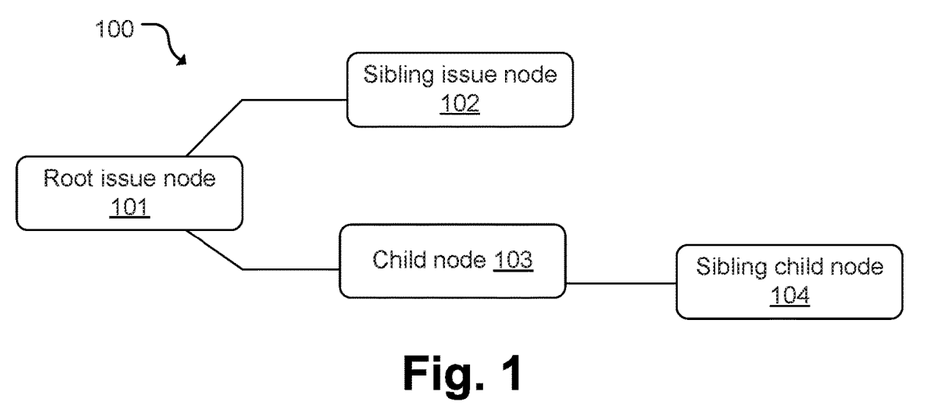
FIG. 1 is a diagrammatic representation of a tree structured storage arrangement in a database of a project management system.

FIG. 1 shows a diagrammatic representation of a tree structured storage arrangement 100 in a database of a project management system. The database has limited item sizes, limiting the size of nodes like those described herein above that can be stored in the database.

Within the storage arrangement 100, a root issue node 101 includes an identifier (e.g. GUID) to identify it to the project management system and a plurality of fields. In the example shown, two of those fields are fields that are each populated with a reference to another node in the project management system. One field is designated for referencing one or more sibling issue nodes (i.e. a sibling node reference field as described above) and the other is designated for referencing one or more child nodes (i.e. a field reference or child node reference field as described above). For simplicity of explanation, in the depicted example both fields are populated with a reference to a single other node. These fields and their references are indicated in FIG. 1 by numerals A and B.

One field reference A of the root issue node 101 references another issue node, a sibling issue node 102. As described above, the sibling issue node 102 has its own identifier (e.g. GUID) and otherwise has the same structure as the root issue node 101. The other field reference B of the root issue node 101 references a child node 103. The child node 103 includes an identifier (e.g. GUID) to identify it to the project management system and a plurality of fields. The child node 103 has a different structure to the root issue node 101 (and sibling issue node 102), including a different set of fields to the root issue node 101. One field of the child node 103 is designated for referencing one or more sibling child nodes. In the depicted example a single field reference C of the child node 103 references a sibling child node 104. The sibling child node 104 includes an identifier (e.g. GUID) to identify it to the project management system and a plurality of other fields with the same structure as the child node 103.

Figure 2:
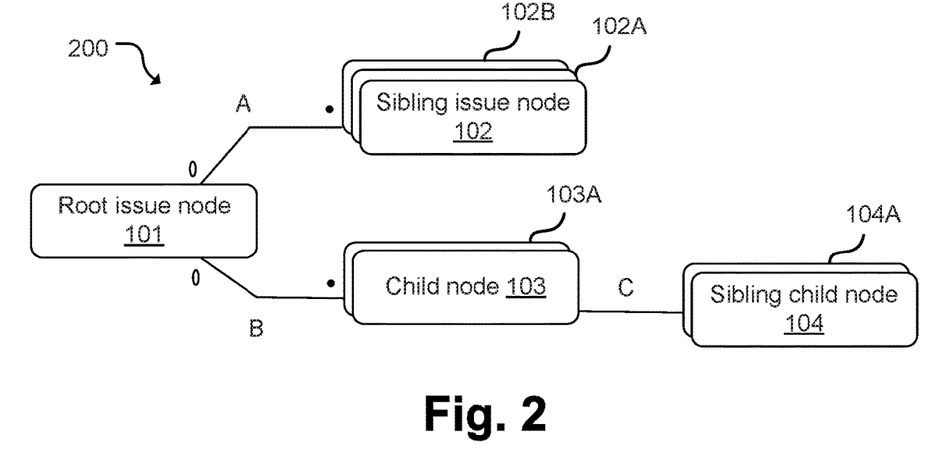
FIG. 2 is a diagrammatic representation of a tree structured storage arrangement in a database of a project management system.

FIG. 2 shows a diagrammatic representation of a tree structured storage arrangement 200 in a database of a project management system. By way of example the storage arrangement 200 may be derived from the storage arrangement 100—for example at one point in time the database may maintain the storage arrangement 100 and then as information is added to the project management system (e.g. additional comments, worklogs or similar on the issue that is the subject of the root issue node 101), the project management system may add nodes to transition to the storage arrangement 200. In another example all nodes of the storage arrangement 200 may be created with the creation of the issue.

In the following description, it is assumed that storage arrangement 200 was derived from storage arrangement 100 and like reference numerals across FIGS. 1 and 2 reference like components. The additional and varied aspects of FIG. 2 in relation to FIG. 1 are described.

The root issue node 101 includes a field reference A that refers to a plurality of sibling issue nodes, including the sibling issue node 102 and sibling issue nodes 102A, 102B. Sibling issue nodes 102A and 102B both share the structure of the root issue node 101 (like sibling issue node 102). The root issue node 101 includes a field reference B that refers to a plurality of child nodes, including the child node 103 and another child node 103A. The child node 103A has or may have a different structure to the child node 103 and a different structure to the root issue node 101. By way of example the child node 103 may be designated for comments and the child node 103A may be designated for worklogs. In the example shown, the child node 103 includes a field reference C that refers to a plurality of sibling child nodes, including a sibling child node 104 and a sibling child node 104A, which has the same structure (as described herein) as child node 103 (and sibling child node 104). In other words siblings are designated for the same field type.

More generally, a root issue node is associable with a) between zero and N sibling issue nodes and b) between zero and M child nodes. Further, each child node is associable with between zero and P sibling child nodes (which are therefore indirectly associated with the root issue node). Still further, each sibling issue node is associable with between zero and M child nodes which in turn may be associable with between zero and P sibling child nodes. The variables N, M and P are project management system-set maximums for the project management system, for example either as an administrator selected arbitrary value or as a constraint having regard to the addressing limitations or other limitations of the system. While it is anticipated that the maximum will be the same as been root and sibling nodes, this is not essential. Similarly, the variable N, M and P may the same or different to each other.

Figure 3:
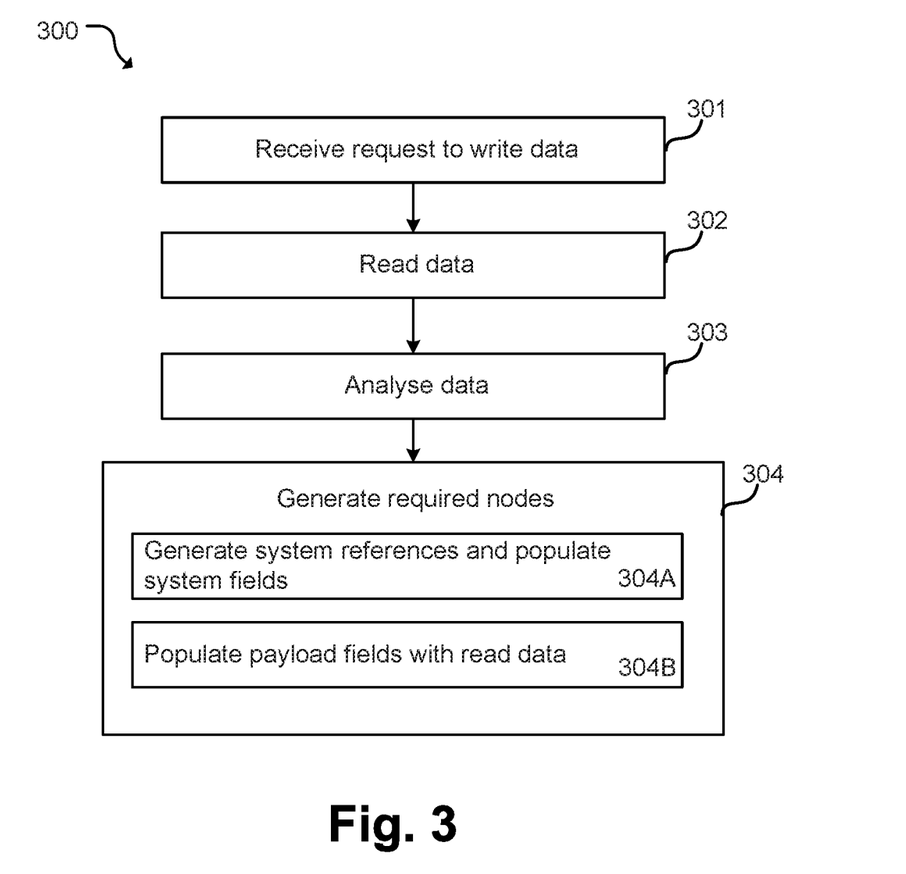
FIG. 3 depicts a general process for creating a new issue node or updating an existing issue node, performed at a project management system.

FIG. 3 shows a general process 300 for creating a new issue node or updating an existing issue node, performed at a project management system. The process 300 includes receive process 301, in which the project management system receives via an interface, a request to write data to a database defining a new issue or defining an update for an existing issue. The request includes a reference to the data to be created or updated to a database of the project management system. In the case of an update to an issue, it includes a reference that identifies the existing issue to the project management system, and the fields to be updated. The project management system reads the referenced data in process 302 and in process 303 analyses the read data. The analysis includes identifying in which node the field needs to be added, updated, or removed. The changes can then be applied.

A result of the analysis is a determination of a number of sibling issue nodes, number of child nodes and number of sibling child nodes required to receive the data. In process 304 the project management system creates, in its associated database, the nodes for the issue, for example as per FIG. 1 or FIG. 2 or a variation thereof, including process 304A of generating information for node fields and populating the node fields for each node, for example a GUID for each node, and process 304B of populating payload fields with the read data.

Figure 4A:
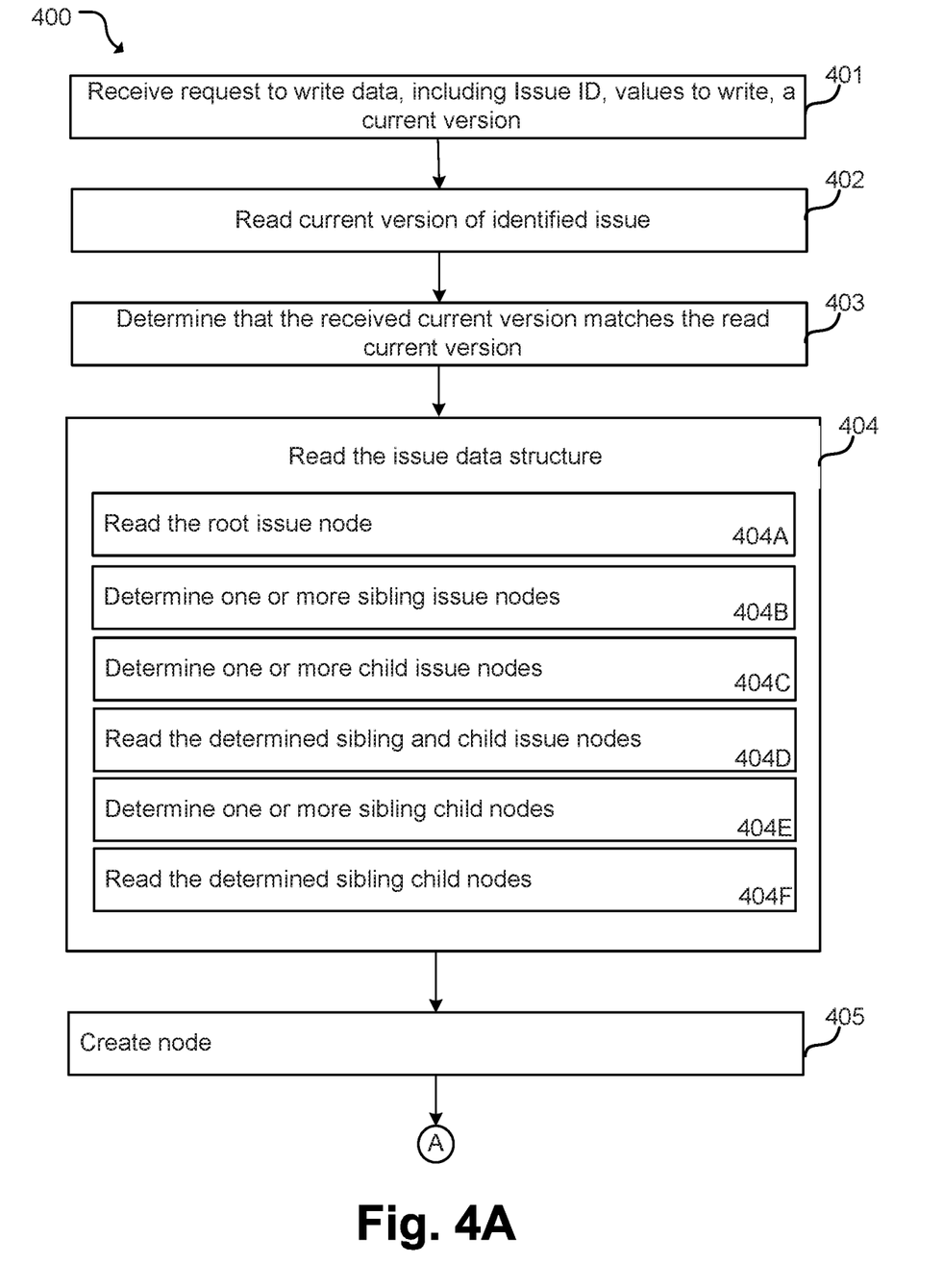
FIGS. 4A and 4B depict a process for updating an issue, performed at a project management system, including FIG. 4A for creating a node and FIG. 4B for updating a tree structure.
Figure 4B:
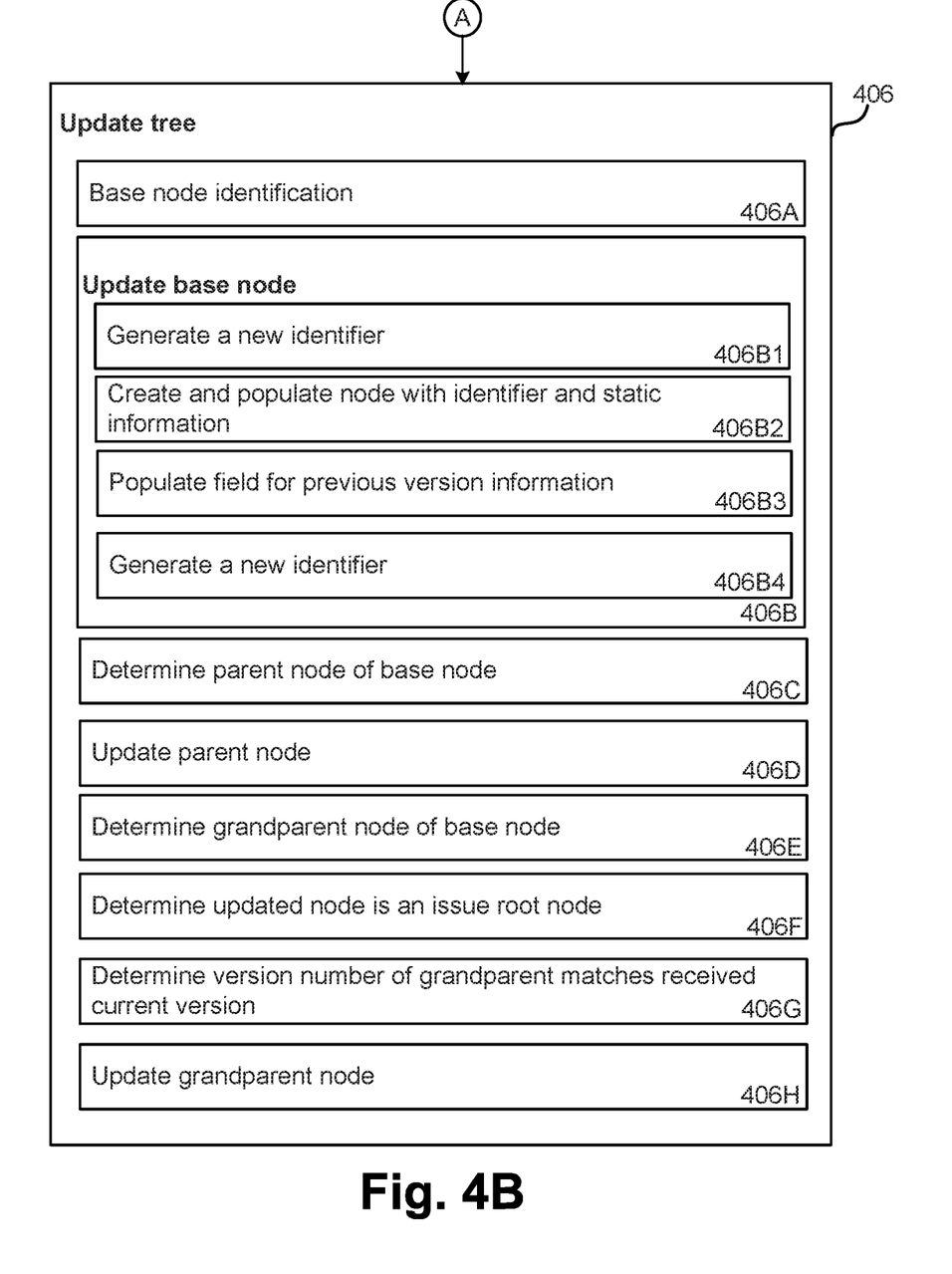

FIGS. 4A and 4B show a process 400 for updating an issue, performed at a project management system. Process 400 may for example, be performed after process 300, which has generated the required nodes. The requests 301 and 401 may accordingly be responsive to the same event in the project management system. That event may be, for example, entry by a user of a comment on an issue of a project and the process 400 is described with reference to this example. Process 400 may be repeated for each of a plurality of updates distributed over time. The same or a similar process will be performed for other updates to an issue, in particular updates that add a new data entity for an issue. The addition of a new data entity for an issue or an addition to a field of a node may require generation of a new node, for example a sibling issue node 102 or a sibling child node 104.

The process 400 includes receive process 401, in which the project management system receives via an interface, a request to add the comment, which request includes an identifier of the issue or issue node (IssueID) and the values to write to form the comment. In some embodiments the request may include information specifying a version of the issue.

In version check process 402, the project management system reads its associated database for the stored version information identifying the latest version entry of the issue node identified by the IssueID. This read is a single get operation of the version information. If the received version from receive process 301 and the read version from the version check process 402 do not match, the request to add a comment is rejected. A rejection notification is sent by the project management system to the system (e.g. client device/application) that requested the addition of the comment. The process of FIGS. 4A and 4B assumes that the project management system determines, in match process 403, that there is a match between the received and read version information.

In read process 404, the project management system reads its associated database for the issue. There may be one or more than one read of the database depending on the node structure of the issue. If the issue is defined completely by a root issue node (as described herein), then only one read is required. If there are one or more sibling or child nodes to the root issue node, then more than one read will be required.

In embodiments where sibling nodes cannot reference other siblings or child nodes and child nodes cannot reference further child nodes, there may be up to three read operations. In process 404A the project management system reads the root issue node identified by the IssueID. In process 404B the project management systems determines that the root issue node references one or more sibling issue nodes. In process 404C the project management systems determines that the root issue node references one or more child issue nodes. In process 404D the project management system reads the referenced one or more sibling issue nodes and the referenced one or more child issue nodes. In process 404E the project management system determines that at least one of the read one or more child issue nodes references one or more sibling child nodes and in process 404F the project management system reads the one or more sibling child issue nodes. In alternative process flows, process 404 may end at 404A or 404D if it is determined that with that read there are no further data entities for the issue. In further alternative process flows, for a project management system configured to allow a variable number of levels, the read process will be recursive until all levels of the tree have been read.

In create node process 405 the project management system generates a new identifier for the comment, e.g. a new GUID, and creates and populates a node for the comment, which may be in the same database as the root issue node or in a different database, for example in a field content service. Process 405 will not be required where the update to an issue does not require the creation of a new node, for example due to being an update of a field in an existing node.

In update tree process 406, the database structure for the issue with the new comment is updated to reflect the addition of the comment. In a base node identification process 406A the project management determines a child node ("the original child node") to contain a child node reference field (e.g. as described above) to reference the comment. The references of the child nodes (ListFieldNode) are mapped to the FieldId. The Root IssueNode has a map<FieldId, NodeId> where, for example, FieldId will be comment. Therefore, if the request has a new comment to be added, the system will read the child node for comments and will add the new comment in the list of items of the child node. If the child node has one or more sibling child nodes, then the child node has a reference of which items (comments) are stored in each sibling child node.

In process 406B the determined original child node is updated. The update includes storing an updated or new child node reference field referencing the comment. As explained herein the reference is to the identifier of the node for the comment. In some embodiments each update to a node for an issue creates a new node, with the node prior to the update retained in the project management system database. In other words, each node entry is immutable. By way of example of those embodiments, process 406B includes process 406B1 of generating a new identifier, and process 406B2 of creating the new node ("the new child node") populated with the new identifier and with information from the fields of the original child node that remain static with the update.

The process 406B may also include process 406B3 of generating a version history of the node and populating a version field in the new child node with (updated) version history information that references the identifier of the original child node. In some embodiments, process 406B4 may be completed, of populating a version field with updated current version information, for example an incremented version number to the version number in the child node. In other embodiments one or both of processes 406B3 and 406B4 are omitted, for example because the child nodes do not include a version number or version history or because a child node is immutable.

In process 406C the project management system determines the next level node in the tree above the child node for the new comment (the parent node). In some embodiments the determination includes identifying the nodes read in process 404 that reference the original child node. With reference to the previously described nodes, the fields for the field references B and C will be checked for the identifier of the original child node. With reference to FIG. 1, if the original child node is the sibling child node 104, then process 406C will determine child node 103 as the parent node, due to the field reference C including the identifier. If the original child node is the child node 103, then process 406C will determine root issue node 101 as the parent node, due to the field reference B including the identifier In process 406D the determined parent node is updated. The update includes replacing the content of the field that references the original child node with a reference to the identifier of the new child node. If provided, a version number of the parent node is also updated, for example by incrementing a version number. In embodiments in which the nodes are immutable, the update of the parent node includes creating a new node with its own identifier. Other fields of the new node that are static with the current update are included in the new node.

If the node determined in process 406D is the child node 103 of FIG. 1, then it also has a parent (root issue node 101), which could be viewed as a grandparent of the base node. In process 406E the project management system determines the grandparent of the original child node, by determining a field reference matching the identifier of the parent node prior to its update.

In process 406F the project management system determines that the last updated node is a root issue node and responsive to that determination a check of the version numbers is initiated. In process 406G the project management system determines that the version number of the root issue node matches the received request (a process the same as or similar to process 403). Responsive to the determination the grandparent node is updated to replace the determined field reference with the identifier of the new parent node. In a like process as described in relation to the other nodes, process 406H of updating the grandparent node may include generating current and previous version information for population in version fields of the updated node. The update may involve creation of a new node that carries across information from the original which is not affected by the update operation.

In some embodiments only the root issue node includes current version information that is changed with each update. In some embodiments only the root issue node includes version history information that is changed with each update. By including version history information in a field of an issue node, it may be loaded, for example into a cache, alongside the issue (which includes current version information), which may result in faster viewing experience of the history data in comparison to, for example, storing version history in a different node.

If the process to check the version numbers prior to process 406G results in a determination that the version numbers do not match, then the project management system may be configured to reject the request to write data. Accordingly, the update is conditional, whereby two requests carrying the same version will compete to update the issue and for example only the first one will "win". Some other embodiments may omit processes 402, 403 and 406G to remove this condition to an update. In those embodiments, the request received in process 401 may omit the version information.

A process to update an inline or system field of node 104 may be similar to process 400. The process 405 is omitted, as the new node is required for the update. Updates to inline or system fields at higher levels of the tree (e.g. to nodes 101-103 of FIG. 1) also involve a similar process to process 400, but with less iterations required to identify higher nodes.

By way of example, the project management system referred to in FIG. 3 or FIGS. 4A and 4B (which may be the same project management system configured to perform both process 300 and process 400), may be implemented as a software as a service. The project management system may include one or more servers, including a webserver via which communications from and to a client device, running a client application. The request received in process 301 or process 401 may be received by the project management system, in particular by the webserver of the project management system. As required, the database storing the nodes is updated by the one or more servers of the project management system and information read from the database for communication to one or more client devices.

To improve efficiency, processes 300 and 400 and other database update processes, for example updates to inline or system fields, may be performed using a cache of the database. For example, process 302 may involve loading the data into a cache prior to the read (if the data is not already present in the cache). Process 303 and 304 may be performed on the cache data. In due course the project management system will update the database with the new value from the cache. Similarly, process 402 may involve loading data into a cache as required, following which processes 403 onwards may be performed on the cached data. Again, in due course the project management system will update the database with the new value from the cache.

An example data structure of an issue node is:
{
stringid=1;
repeatedFieldinline_fields=2;
map<string,string>list_fields=3;
repeatedstringsiblings=4;
}
In this example:
The stringid is the node identifier (placeholder "1"), which may be the IssueID described above.
The repeatedFieldinline_fields are each references to an inline or system field (placeholder "2"), of which there may be one or more than one of each field. Each may also include the identifier, type designation and a value.
The map<string, string>list_fields is a reference to the child nodes (placeholder "3").
The repeatedstringsiblings is a reference to the sibling node or nodes (placeholder "4") of the issue node.
An example data structure of a child node is:
{
stringid=1;
stringtype=2;
map<string,ListField>items=3;
repeatedstringsiblings=4;
}

In this example:
The stringid is node identifier (placeholder "1").
The stringtype specifies the type of entity referred to (e.g. specifying that the referenced data entities are comments as opposed to another type of entity in the project management system).
The map<string,ListField>items contains the issue field values or references the child field values (e.g. nodes with comments).
The repeatedstringsiblings is a reference to the sibling node or nodes (placeholder "4") of the child node.

Figure 5:
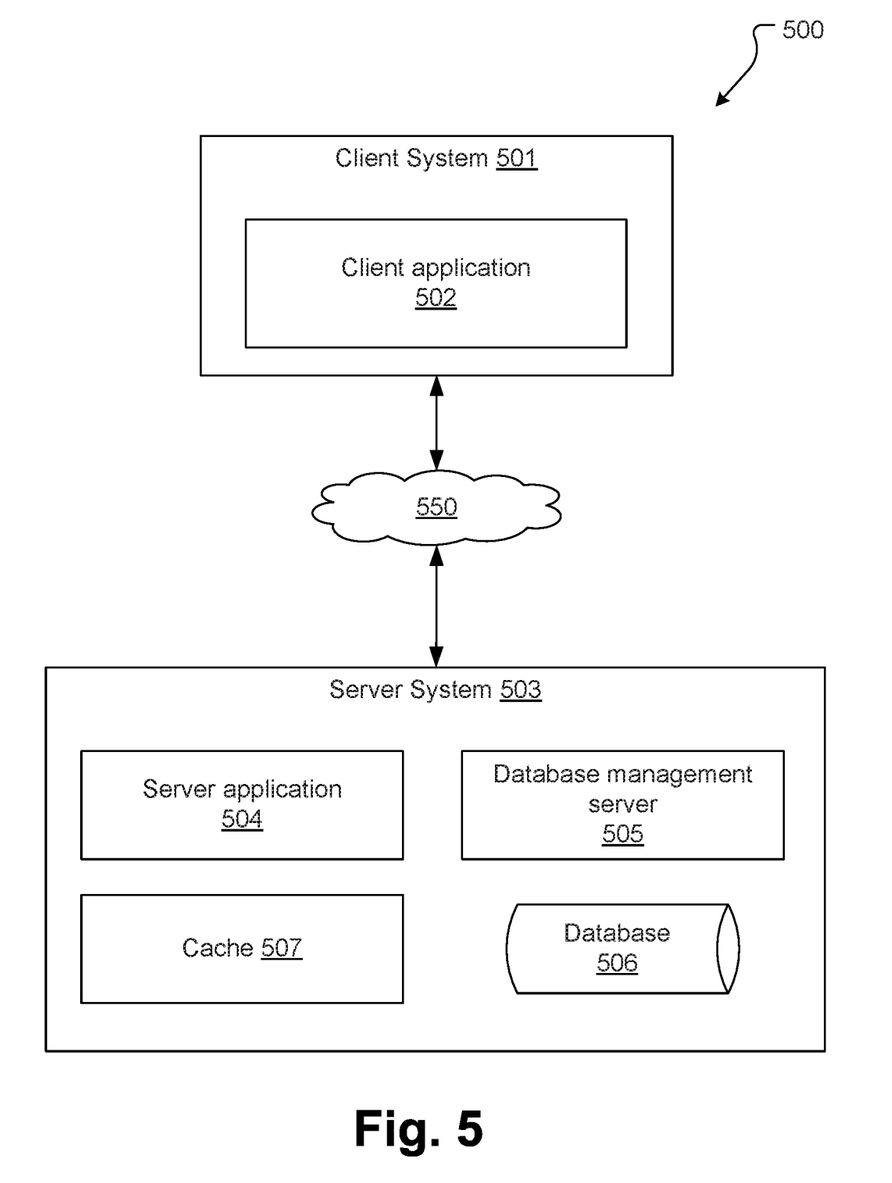
FIG. 5 is example of a networked environment in which network components have been configured to perform operations and techniques of embodiments of a project management system.

FIG. 5 depicts one example of a networked environment 500 in which network components have been configured to perform operations and techniques of embodiments described herein. A client system 501 and a server system 503 communicate via a network 550, which may be a public/untrusted communications network 180 (e.g. the Internet). The network 550 could instead be a private network. One or more other client systems may also form part of the network environment 500 and in communication with the server system 503 via the network 550.

The client system 501 provides a client application 502 for a project management service. The client application 502 may be, for example a web browser, or a project management specific application. The client application allows, for example, users of the system to create and update issues and other data entities of the project management service. It will be appreciated that one client system 501 may create a request to create an issue, another may request a first update and another may request a second update and so forth.

The server system 503 provides the project management service. Functions and communications of the project management service are provided by a server application 504, including for example process 300 and process 400 described above. In some embodiments the server application 504 communicates with a database management server 505, which manages a database 506 that stores the data entities of the project management service, including the nodes for issues and other data entities of the project management service described herein. The database 506 may have an associated cache 507, to which data entities may be loaded for faster access and update by the server application 504 as required.

The client system 501 and server system 503 typically include additional components to those illustrated and described. As one example, the server system 503 typically includes one or more firewalls and/or other network security components and load balancers and typically includes user management modules controlling access and authorisation to and in respect of information in the database 506.

Figure 6:
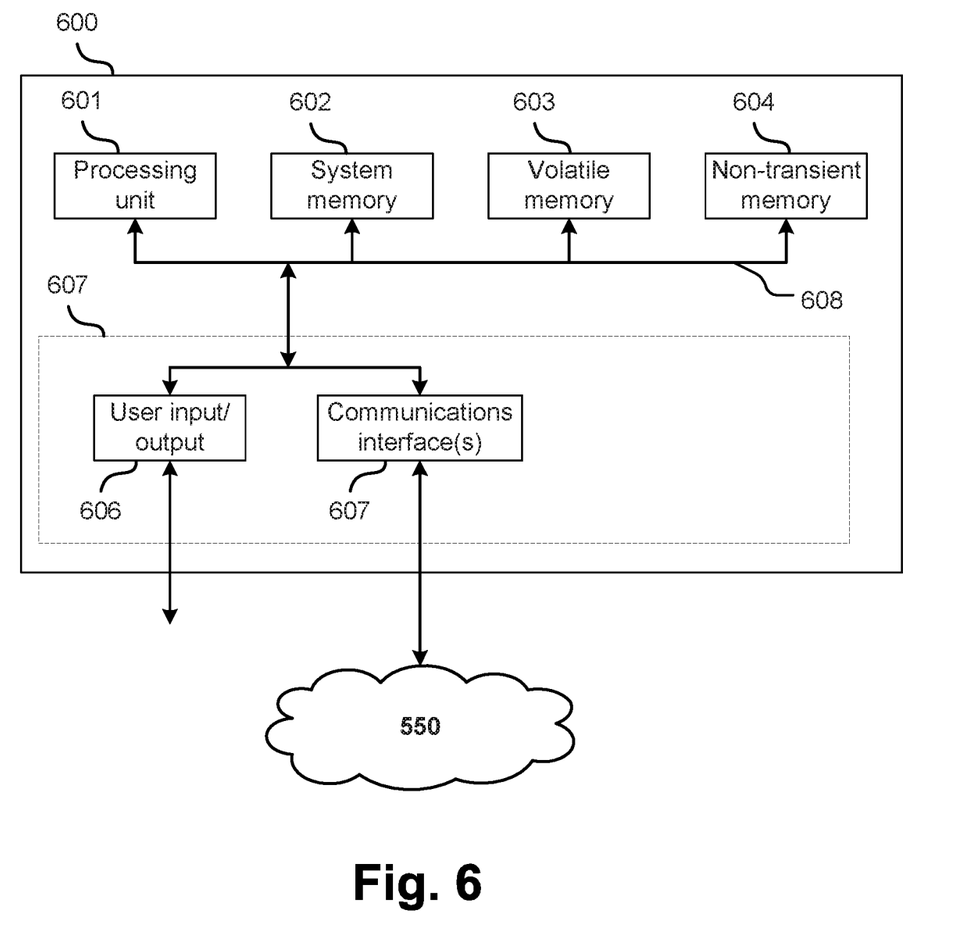
FIG. 6 is a block diagram of a computer processing system configurable to implement embodiments and/or features of a project management system.

FIG. 6 provides a block diagram of a processing system 600 configurable to implement embodiments and/or features described herein, including the client system 501 or the server system 503. System 600 is a general purpose computer processing system. It will be appreciated that FIG. 6 does not illustrate all functional or physical components of a computer processing system. For example, no power supply or power supply interface has been depicted, however system 600 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Processing system 600 includes at least one processing unit 601. The processing unit 601 may be a single computer processing device (e.g. a central processing unit, graphics processing unit, or other computational device), or may include a plurality of computer processing devices. In some instances, where a computer processing system 600 is described as performing an operation or function all processing required to perform that operation or function will be performed by processing unit 601. In other instances, processing required to perform that operation or function is also performed by remote processing devices accessible to and useable by (either in a shared or dedicated manner) system 600.

Through a communications bus 608 the processing unit 601 is in data communication with one or more machine readable storage (memory) devices which store instructions and/or data for controlling operation of the processing system 600. In this example system 600 includes a system memory 602 (e.g. a BIOS), volatile memory 603 (e.g. random access memory), and non-volatile or non-transient memory 604 (e.g. one or more hard disk or solid state drives).

System 600 also includes one or more interfaces, indicated generally by 605, via which system 600 interfaces with various devices and/or networks. The interfaces may include user input and user output devices 606 and one or more other communication interfaces 607. Generally speaking, other devices may be integral with system 600, or may be separate. Where a device is separate from system 600, connection between the device and system 600 may be via wired or wireless hardware and communication protocols, and may be a direct or an indirect (e.g. networked) connection.

Depending on the particular system in question, devices to which system 600 connects—whether by wired or wireless means—include one or more input devices to allow data to be input into/received by system 600 for processing by the processing unit 601, and one or more output devices to allow data to be output by system 600. Example devices are described below, however it will be appreciated that not all computer processing systems will include all mentioned devices, and that additional and alternative devices to those mentioned may well be used.

For example, system 600 may include or connect to one or more input devices by which information/data is input into (received by) system 600. Such input devices may include keyboards, mice, trackpads and the like. System 600 may also include or connect to one or more output devices controlled by system 600 to output information. Such output devices may include devices such as displays, touch screen displays, speakers, LEDs/other lights, and such like. The input and/or output devices may be another computer processing system. System 600 may also include or connect to devices which may act as both input and output devices, for example memory devices (hard drives, solid state drives, disk drives, compact flash cards, SD cards and the like) which system 600 can read data from and/or write data to, and touch screen displays which can both display (output) data and receive touch signals (input).

The communications interfaces 607 include devices for communication with a network, such as the network 550 of FIG. 5. Via the communications interface(s) 607, the system 600 can communicate data to and receive data from networked devices, which may themselves be other computer processing systems.

System 600 stores or has access to computer applications (also referred to as software or programs)—i.e. computer readable instructions and data which, when executed by the processing unit 601, configure system 600 to receive, process, and output data. Instructions and data can be stored on non-transient machine readable medium accessible to system 600. For example, instructions and data may be stored on non-transient memory 604. The instructions for the migration service of the client system 501 or server system 503 may be in non-transient memory 604.

In some cases part or all of a given computer-implemented method will be performed by system 600 itself, while in other cases processing may be performed by other devices in data communication with system 600. The system 600 may be one or more servers providing a project management service as described herein.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless otherwise stated, the terms "first", "second", "third" and so forth are used to indicate individual instances of the object or process referred to and are not used to indicate any required ordering, in time or otherwise.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method comprising:
providing at a server system at least one software service, comprising maintaining in a database at least one issue for a project management service, the at least one issue comprising a plurality of data entities in the database, the plurality of data entities comprising a first data entity and a second data entity;
wherein:
the first data entity comprises a first set of a plurality of fields, comprising a first field populated with a reference to the second data entity;
the second data entity comprises a second set of a plurality of fields, different to the first set; and
the first data entity and the second data entity are subject to at least one size constraint within the database;
receiving at the server system a first request to update the issue;
responsive to the first request, reading the first data entity and the second data entity and determining by the server system based on the at least one size constraint, that a third data entity is required for the issue in the database; and
creating the third data entity and changing the first data entity by a first change process comprising populating a second field of the first data entity with a reference to the third data entity, wherein the second field is different to the first field and wherein the third data entity has a plurality of common fields with the first data entity.

2. The method of claim 1, further comprising:
receiving at the server system a second request to update the issue, wherein the second request is received subsequent to the first request; and
responsive to the second request to update the issue:
performing a first read operation of the database, the first read operation comprising reading the first field and the second field of the first data entity;
performing a second read operation of the database, the second read operation comprising, based on the first field and the second field of the first data entity, reading both the second data entity and the third data entity; and then
causing a change to the issue in the database, the change comprising a respective change to at least one of the first data entity, the second data entity and the third data entity based on the second request to update the issue.

3. The method of claim 2, further comprising responsive to the second request to update the issue:
determining by the server system based on the at least one size constraint, that a fourth data entity is required for the issue in the database;
wherein causing a change to the issue in the database comprises:
creating the fourth data entity in the database and populating a field of the second data entity with a reference to the fourth data entity, wherein the fourth data entity has a plurality of common fields with the second data entity.

4. The method of claim 2, further comprising retaining in the database a first version of the first data entity prior to the first change process and a second version of the first data entity subsequent to the first change process, wherein the first read operation comprises reading the second version of the first data entity.

5. The method of claim 4, wherein the first version and second versions of the first data entity are data entities with different identifiers.

6. The method of claim 3, wherein the process of populating a field of the second data entity with a reference to the fourth data entity comprises retaining a first version of the second data entity without the reference to the fourth data entity and generating a second version of the second data entity with the reference to the fourth data entity.

7. The method of claim 6 further comprising retaining a first version of the first data entity with a reference to the first version of the second data entity and generating a new version of the first data entity with a reference to the second version of the second data entity.

8. The method of claim 7, wherein each version of a said data entity is a data entity in the database with a unique identifier and wherein a reference to a version of a data entity comprises the unique identifier of that data entity.

9. A method comprising:
providing at a server system at least one software service, comprising maintaining in a database at least one issue for a project management service, the at least one issue comprising a plurality of data entities in the database, the plurality of data entities comprising a first data entity and a second data entity;
wherein:
the first data entity comprises a first set of a plurality of fields, comprising a first field populated with a reference to the second data entity;
the second data entity comprises a second set of a plurality of fields, different to the first set;
the first data entity and the second data entity are subject to at least one size constraint within the database;
receiving at the server system a first request to update the issue;
responsive to the first request, reading the first data entity and the second data entity and determining by the server system based on the at least one size constraint, that a third data entity is required for the issue in the database;
creating the third data entity and changing the second data entity by a first change process comprising populating a first field of the second data entity with a reference to the third data entity, wherein the third data entity has a plurality of common fields with the second data entity.

10. The method of claim 9, further comprising:
receiving at the server system a second request to update the issue, wherein the second request is received subsequent to the first request; and
responsive to the second request to update the issue:
determining by the server system based on the at least one size constraint, that a fourth data entity is required for the issue in the database; and
causing a change to the issue in the database comprising creating the fourth data entity in the database and populating a second field of the first data entity with a reference to the fourth data entity, wherein the fourth data entity has a plurality of common fields with the first data entity.

11. The method of claim 9, further comprising:
receiving at the server system further request in relation to the issue, wherein the further request is received subsequent to the second request to update the issue; and
responsive to the further request in relation to the issue:
performing a first read operation of the database, the first read operation comprising reading the first field and the second field of the first data entity;
performing a second read operation of the database, the second read operation comprising, based on the first field and the second field of the first data entity, reading both the second data entity and the fourth data entity; and
performing a third read operation of the database, the third operation comprising, based on the first field of the second data entity, reading the third data entity.

12. A processing system comprising:
one or more computer processing devices;
database storage in communication with the one or more computer processing devices;
software for the one or more computer processing devices, the software comprising instructions to:
configure the one or more computer processing devices to provide a project management service comprising maintaining in the database storage data entities defining nodes for an issue associated with a project, the data entities comprising a first data entity defining a root node for the issue and a second data entity defining a child node of the root node;
based on at least one size limit in relation to the data entities maintained in the database storage, create one or more sibling nodes for at least one of the root node an the child node to receive additional information for the issue.

13. The processing system of claim 12, configured to limit the nodes associable with an issue to the root node, one or more sibling nodes to the root node and one or more sibling nodes to the child node, whereby all nodes associable with an issue are readable within three read operations of the database.

14. The processing system of claim 12, wherein the root node includes a field referring to the child node and a field referring to each sibling to the root node and wherein the child node includes a field referring to each sibling of the child node.

15. The processing system of claim 14, wherein the child node does not include a reference to the root node and each said sibling node does not include a reference to any other sibling node or the root node.

16. The processing system of claim 12, wherein the software comprises instructions to perform a requested update to the issue by an update process, comprising:
   reading each node of the issue and determining the child node is to be updated;
   creating a new data entity in the database storage for the child node and populating the new data entity based in part on the requested update;
   creating a new data entity in the database storage for the root node, the new root node referencing the new data entity for the child node.

17. The processing system of claim 12, wherein the software comprises instructions to perform a requested update to the issue by an update process, comprising:
   reading each node of the issue and determining a said sibling node to the root node is to be updated;
   creating a new data entity in the database storage for the determined sibling node and populating the new data entity based in part on the requested update;
   creating a new data entity in the database storage for the root node, the new root node referencing the new data entity as a sibling node.

18. The processing system of claim 12, wherein the software comprises instructions to perform a requested update to the issue by an update process, comprising:
   reading each node of the issue and determining a said sibling node to the child node is to be updated;
   creating a first new data entity in the database storage for the determined sibling node and populating the new data entity based in part on the requested update;
   creating a second new data entity in the database storage for the child node, the new child node referencing the new data entity as a sibling node; and
   creating a new data entity in the database storage for the root node, the new root node referencing the second new data entity as a child node.

19. Non-transient computer readable memory storing instructions, which when executed by a processing system cause the processing system to perform a method, comprising:
   configuring the processing system to provide a project management service comprising maintaining in a database storage data entities defining nodes for an issue associated with a project, the data entities comprising a first data entity defining a root node for the issue and a second data entity defining a child node of the root node;
   maintaining at least one size limit in relation to the data entities maintained in the database storage; and
   based on the at least one size limit, create one or more sibling nodes for at least one of the root node an the child node to receive additional information for the issue.

* * * * *